United States Patent [19]

Nishijima et al.

[11] Patent Number: 5,117,045
[45] Date of Patent: May 26, 1992

[54] METHOD OF PRODUCING CHLORINATED EVA

[75] Inventors: Yoshitatsu Nishijima; Terumasa Fujitaka; Kazuo Shimizu, all of Iwakuni, Japan

[73] Assignee: Sanyo-Kokusaku Pulp Co., Ltd., Tokyo, Japan

[21] Appl. No.: 608,845

[22] Filed: Nov. 5, 1990

[30] Foreign Application Priority Data

Dec. 26, 1989 [JP] Japan ................. 1-336904

[51] Int. Cl.$^5$ ............ C07C 69/62; C07C 67/02
[52] U.S. Cl. ................. 560/219; 560/266
[58] Field of Search ............. 560/219, 260

[56] References Cited

U.S. PATENT DOCUMENTS

| 3,480,661 | 11/1969 | Riest et al. | 560/219 |
| 3,882,169 | 5/1975 | Hrabar et al. | 560/219 |
| 4,421,664 | 12/1983 | Anderson | 252/94 |
| 4,489,210 | 12/1984 | Judat et al. | 560/219 |

FOREIGN PATENT DOCUMENTS

| 1942902 | 2/1970 | Fed. Rep. of Germany . |
| 2202215 | 8/1972 | Fed. Rep. of Germany . |
| 2402659 | 8/1974 | Fed. Rep. of Germany . |
| 2557654 | 6/1977 | Fed. Rep. of Germany . |
| 019627 | 3/1973 | Japan . |
| 155234 | 12/1981 | Japan . |
| 021434 | 2/1982 | Japan . |
| 173173 | 10/1983 | Japan . |
| 201837 | 11/1983 | Japan . |
| 609156 | 9/1948 | United Kingdom . |

OTHER PUBLICATIONS

Lippold, B. et al., Acta Pharm Technol. 30(2), 140–54, 1984.
Li, H. et al., Nanjing Yaoxueyuan Xuebao, 15(1) 57–60, 1984.
Kusvcoua, M., Petrochemia, 20(2) 52–8, 1980.
Von Fraunhofer, J. A. et al., Paint Technol., 35(1) 5–11, 1971.

*Primary Examiner*—Paul J. Killos
*Attorney, Agent, or Firm*—Oblon, Spivak, McClelland, Maier & Neustadt

[57] ABSTRACT

The invention relates to a method for producing solvent-soluble chlorinated ethylene-vinyl acetate copolymer by conducting homogeneous chlorination of ethylene-vinyl acetate copolymer in aqueous suspension by irradiation or by organic or inorganic radical generation, which method comprises conducting the chlorination upon a powder of ethylene-vinyl acetate copolymer containing 5 to 35 wt % of vinyl acetate and having a specific surface area of not less than 300 cm$^2$/g at a reaction temperature dependent upon the content of vinyl acetate as expressed in the relationship:

$$20 \leq [\text{reaction temperature (°C.)}] \leq 60 - [\text{vinyl acetate content (wt. \%)}].$$

2 Claims, No Drawings

METHOD OF PRODUCING CHLORINATED EVA

BACKGROUND OF THE INVENTION

The present invention relates to a method of producing chlorinated EVA, in more detail, to a method of obtaining solvent-soluble chlorinated EVA useful as a resin for printing ink, wherein the chlorinating reaction is conducted at an optimum temperature depending on the content of vinyl acetate while suspending EVA powder containing 5 to 35 wt. % of vinyl acetate into aqueous medium.

As can be seen in Japanese Patent Publication No. sho 47-46203, the solvent-soluble chlorinated EVA has been obtained so far by a method of conducting the chlorinating reaction after dissolved EVA into a chlorine-resistant organic solvents such as carbon tetrachloride etc. and is widely used as a resin for printing ink based on the features such as transparency and gloss.

In recent, however, the influences of organic solvents on the human body and the global environment have become anxious worldwide and the use of organic solvents has to be severely restricted also from a legal point of view. In particular, with respect to a part of organic halides, a proposal appealing for the overall abolition of use was presented to the international conference and it is the situation that the related industries are driven by the investigations to alternatives or replaceable techniques.

Thus, the inventors investigated a production method of chlorinated EVA not using organic solvents such as carbon tetrachloride etc. and found that most of the conventional methods for chlorinating polyolefin etc. in aqueous suspension related to the production methods for molding materials as can be seen in Japanese Unexamined Patent Publication No. sho 51-138791 etc., and it is common knowledge that the solubility in solvent is insufficient primarily due to the inhomogeneous chlorination and thus partially remaining crystallinity.

Further, with respect to the chlorinating method of EVA in aqueous suspension, it is dealt with very often similarly with the chlorinating methods of polyethylene (Japanese Unexamined Patent Publication No. sho 61-179205 and No. sho 53-146793), thus it is the present status that the melt-bonding and lumping occurring during the reaction cannot be prevented because of inadequate reaction conditions. Although such methods are known as the measures therefor that water-soluble polymers or organic or inorganic fine powders are added (Japanese Patent Publication No. sho 46-21729 and No. sho 46-21887), incorporation thereof would provide adverse effects on the performance of chlorinated EVA if remaining as they are, and yet the removal thereof is rather difficult.

Based on these facts, it can be said as an important theme for solving the social problem aforementioned to find out an optimum method of producing chlorinated EVA useful as a resin for printing ink by the aqueous suspension method not using halogenated organic solvents such as carbon tetrachloride etc.

As a result of extensive investigations for solving said theme, the inventors have found the following leading to the completion of the invention.

SUMMARY OF THE INVENTION

A solvent-soluble chlorinated EVA can be obtained, it being 20≦[reaction temperature (°C.)]≦60−[vinyl acetate content of EVA (wt. %)], when conducting chlorinating reaction while suspending powder of EVA containing 5 to 35 wt. % of vinyl acetate and having a specific surface area of not less than 300 cm$^2$/g into aqueous medium.

DETAILED DESCRIPTION OF THE INVENTION

EVA powder with a specific surface area of not less than 300 cm$^2$/g is used as a raw material. If under this range, homogeneous chlorination is difficult within the central portion of powder, tending to leave insolubles. Moreover, the content of vinyl acetate is preferably to be 5 to 35 wt. %. If under this range, homogeneous chlorination is difficult and, if over, individual powder tends to cause blocking during the reaction. Major component of aqueous medium to be used for the reaction is water and alcohols or surfactants that facilitate the affinity of powder surface to water may be added thereto. However, since EVA powder becomes more dispersible into water by itself as the surface is chlorinated, addition of additives beyond the need is not preferable, which results in difficult removal after the reaction.

The reaction temperature is preferably 20° to 60° C. and it is better to conduct the reaction at a temperature about 40° to 50° C. lower than the softening temperature of raw material depending on the content of vinyl acetate. However, the solvent-soluble chlorinated EVA can be obtained for the best, when being 20≦[reaction temperature (°C.)]≦60−[vinyl acetate content of EVA (wt. %)] in the relationship between the content of vinyl acetate in raw material and the optimum reaction temperature.

If higher than the temperature on said right side, individual powder would tend to cause the melt-bonding and lumping and, if lower than 20° C., the reactivity would become poor. It is desirable to conduct the reaction within a range 10° C. lower than the temperature on right side.

For the initiation of chlorinating reaction, light irradiation from fluorescent lamp, mercury-vapor lamp or the like commonly used, or organic or inorganic radical generators such as benzoyl peroxide, azobisisobutyronitrile and ammonium persulfate can be used.

The production method of chlorinated EVA of the invention is characterized in that homogeneous chlorinating reaction progresses in aqueous suspension by controlling the reaction temperature without using auxiliaries such as water-soluble polymers and fine particles except raw material to obtain chlorinated EVA which is solvent-soluble and useful as a resin for printing ink.

For the conventional chlorinating reaction of polyethylene in aqueous suspension, temperature is made to be higher than 50° C. and 25° to 30° C. or more lower than melting point in most cases. In the case of chlorinating EVA, however, it was difficult to prevent the lumping of particles under those conditions.

Since the melting point of EVA is primarily as low as under 100° C. compared with polyethylene and the stickiness tends to occur in the vicinity of melting point, the reaction temperature of over 50° C. was too high and the temperature only 25° to 30° C. lower than the melting point was insufficient for preventing the lumping.

This is because the acetic ester groups in the structure of EVA decrease the crystallinity of ethylenic chain portions and afford the plasticity to the polymer itself to become a cause for the tendency of melt-bonding and lumping compared with polyethylene.

Therefore, in consequence of various investigations on the temperature condition not causing the lumping at a lower temperature than the melting point, it has been found that the chlorinating reaction progresses best to afford the solvent-soluble chlorinated EVA, when the relationship to the content of vinyl acetate in EVA of raw material is $20 \leq [\text{reaction temperature (°C.)}] \leq 60 - [\text{vinyl acetate content of EVA (wt. \%)}]$ Moreover, the affinity of EVA to aqueous medium is better than that of polyethylene due to the acetic ester groups and further, when starting the chlorination of powder surface, the affinity to chlorine and hydrochloric acid dissolved into aqueous medium also becomes good, homogeneous suspension therefore tends to result during the reaction even without using the dispersants particularly.

In following, the production method of chlorinated EVA will be illustrated concretely based on the examples, but the invention is not confined to these.

EXAMPLE 1

Into 8.5 liters of water, 500 g of powder EVA [specific surface area (determined with flow-type specific surface area-measuring apparatus made by Shimazu Seisakusho): 800 cm$^2$/g, melting point: 97° C.] containing 6 wt. % of vinyl acetate were dispersed and suspended, after wetted with 100 g of methanol. This aqueous suspension was warmed to 55° C. and chlorine gas was blown-in under the condition of irradiation with mercury-vapor lamp while stirring to chlorinate to 50% chlorine content. The lumping of polymer did not occur during the reaction. After washing and drying according to usual method, the chlorinated EVA was dissolved into toluene to obtain 20% solution.

EXAMPLE 2

Into 8.5 liters of water, 500 g of powder EVA (specific surface area: 575 cm$^2$/g, melting point: 80° C.) containing 19 wt. % of vinyl acetate were dispersed and suspended, after wetted with 100 g methanol. This aqueous suspension was warmed to 40° C. and chlorine gas was blown-in under the condition of irradiation with mercury-vapor lamp while stirring to chlorinate to 35% chlorine content. The lumping of polymer did not occur during the reaction. After washing and drying according to usual method, the chlorinated EVA was dissolved into toluene to obtain 20% solution.

EXAMPLE 3

Into 8.5 liters of water, 500 g of powder EVA (specific surface area: 700 cm$^2$/g, melting point: 73° C.) containing 28 wt. % of vinyl acetate were dispersed and suspended, after wetted with 100 g of methanol. This aqueous suspension was warmed to 30° C. and chlorine gas was blown-in under the condition of irradiation with mercury-vapor lamp while stirring to chlorinate to 25% chlorine content. The lumping of polymer did not occur during the reaction. After washing and drying according to usual method, the chlorinated EVA was dissolved into toluene to obtain 20% solution.

COMPARATIVE EXAMPLE 1

Into 8.5 liters of water, 500 g of powder EVA (specific surface area: 575 cm$^2$/g, melting point: 80° C.) containing 19 wt. % of vinyl acetate were dispersed and suspended, after wetted with 100 g of methanol. This aqueous suspension was warmed to 55° C. and chlorine gas was blown-in under the condition of irradiation with mercury-vapor lamp while stirring to chlorinate to 35% chlorine content. The lumping of polymer partly occurred during the reaction, but the reaction was forwarded as it was. After the reaction, chlorinated EVA was washed and dried according to usual method and dissolved into toluene to obtain 20% solution.

COMPARATIVE EXAMPLE 2

Into 8.5 liters of water, 500 g of powder EVA (specific surface area: 700 cm$^2$/g, melting point: 73° C.) containing 28 wt. % of vinyl acetate were dispersed and suspended, after wetted with 100 g of methanol. This aqueous suspension was warmed to 50° C. and chlorine gas was blown-in under the condition of irradiation with mercury-vapor lamp while stirring to chlorinate to 25% chlorine content. The lumping of polymer occurred during the reaction, but the reaction was forwarded as it was. After the reaction, chlorinated EVA was washed and dried according to usual method and dissolved into toluene to obtain 20% solution.

Of respective 20% toluene solutions of chlorinated EVAs obtained in examples and comparative examples, existence of insolubles and transparency were observed visually.

Moreover, printing inks were prepared with the following ink composition, which were coated onto polypropylene film and dried at room temperature. Of these, surface gloss was determined to evaluate the printability. These results are shown in Table 1.

| | |
|---|---|
| Resin solution (Example 1,2 and 3, Comparative example 1 and 2) | 125 parts |
| Pigment (Carmine 6 BN made by Tokyo Ink Mfg. Co., Ltd.) | 20 parts |
| Ethyl acetate | 30 parts |
| Toluene | corrective amount to a fixed viscosity |

TABLE 1

| | Existence of insolubles | Transparency | Gloss | Evaluation |
|---|---|---|---|---|
| Example 1 | No | Good | 55% | Good |
| Example 2 | No | Good | 58% | Good |
| Example 3 | No | Good | 62% | Good |
| Comparative example 1 | Yes | Slight turbidity | 30% | Poor |
| Comparative example 2 | A little | Good | 36% | Poor |

As described above, in accordance with the inventive production method, it is obvious that solvent-soluble chlorinated EVA can be obtained while preventing the melt-bonding and lumping of powder during the chlorinating reaction. Moreover, by the inventive method, the supply of chlorinated EVA as a resin for printing ink becomes possible without using organic solvents such as carbon tetrachloride etc.

What is claimed is:

1. A method for producing solvent-soluble chlorinated ethylene-vinyl acetate copolymer by conducting homogeneous chlorination of ethylene-vinyl acetate copolymer in aqueous suspension by irradiation or by organic or inorganic radical generation, which method comprises conducting the chlorination upon a powder of ethylene-vinyl acetate copolymer containing 5 to 35 wt % of vinyl acetate and having a specific surface area of not less than 300 cm$^2$/g at a reaction temperature dependent upon the content of vinyl acetate as expressed in the relationship:

$$20 \leq [\text{reaction temperature (°C.)}] \leq 60 - [\text{vinyl acetate content (wt. \%)}].$$

2. The method according to claim 1, wherein the solvent-soluble chlorinated ethylene-vinyl acetate copolymer contains 5 to 60% chlorine.

* * * * *